H. C. MILLER.
PAINT MEASURING AND FILLING MACHINE.
APPLICATION FILED MAY 29, 1920.
1,391,488.
Patented Sept. 20, 1921.
2 SHEETS—SHEET 1.
Fig. 3.
Fig. 3ª
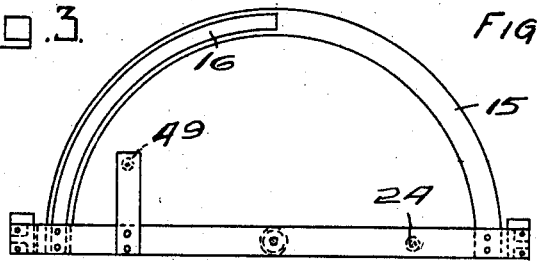
Fig. 2.
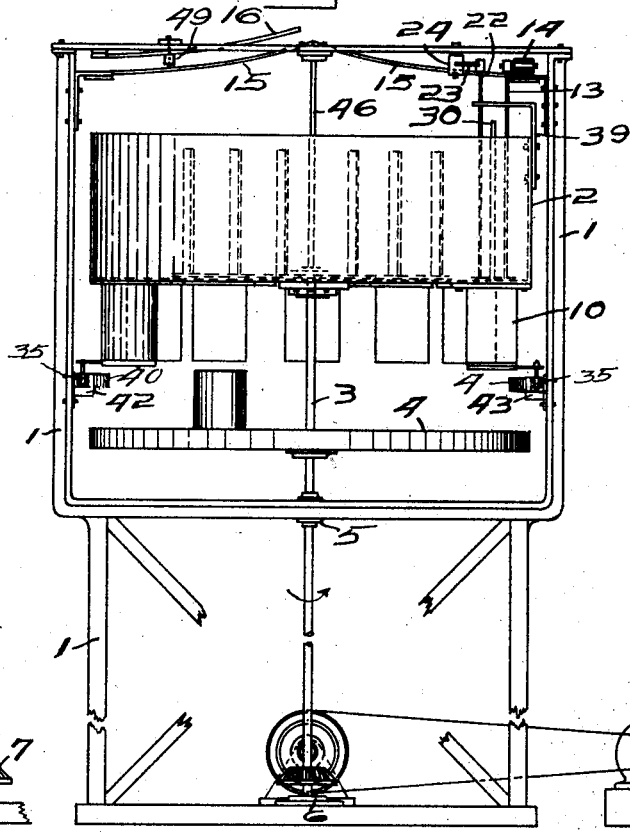
Fig. 4.   Fig. 1.
INVENTOR
Howard C. Miller
by
Owen, Owen & Crampton

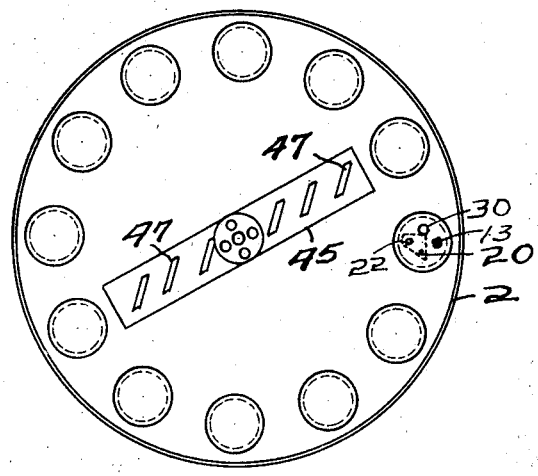
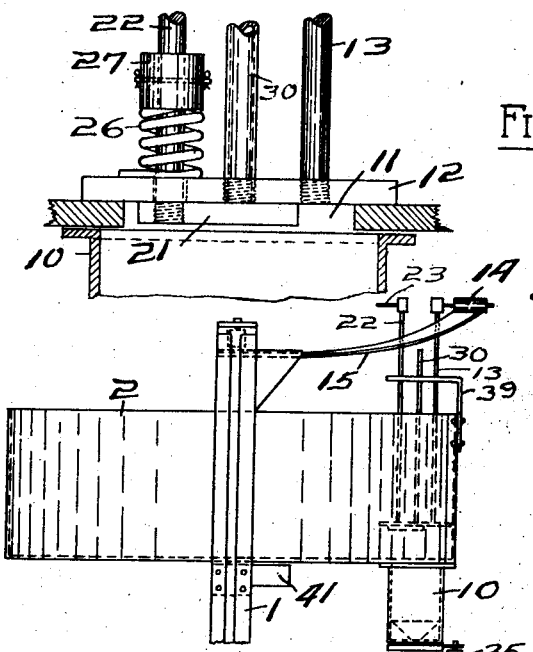
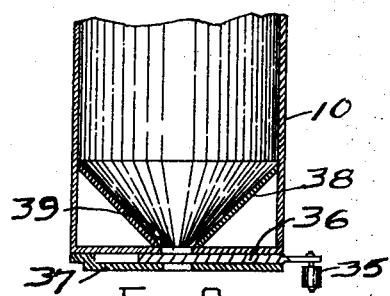

UNITED STATES PATENT OFFICE.

HOWARD C. MILLER, OF TOLEDO, OHIO.

PAINT MEASURING AND FILLING MACHINE.

1,391,488.

Specification of Letters Patent. Patented Sept. 20, 1921.

Application filed May 29, 1920. Serial No. 385,166.

*To all whom it may concern:*

Be it known that I, HOWARD C. MILLER, a citizen of the United States, and a resident of Toledo, in the county of Lucas and State of Ohio, have made an Invention Appertaining to Paint Measuring and Filling Machines; and I do hereby declare the following to be a full, clear, and exact description of the invention, such as will enable others skilled in the art to which it appertains to make and use the same, reference being had to the accompanying drawings, and to the characters of reference marked thereon, which form a part of this specification.

My invention has for its object to provide an efficient means for rapidly filling receptacles with a mobile material, such as paint. The invention particularly has for its object to provide a continuously operated mechanism wherein cans may be continuously fed to the machine and removed from the machine, the machine operating to automatically measure the material and fill the cans. The invention has for its object other features and advantages which will appear from the following description and upon examination of the drawings.

The invention may be contained in receptacle filling devices of different forms. To illustrate a practical application of the invention I have selected a structure containing the invention and shall describe it hereinafter. The structure selected is illustrated in the accompanying drawings.

Figure 1 is a front view of the device. Fig. 2 is a top view of a cam runway for operating parts of the mechanism. Fig. 3 and Fig. 3a are segregated sectional views showing the relative position of the different parts of the mechanism illustrated in Fig. 1. Fig. 4 is a side view of the driving mechanism. Fig. 5 is a top view of the vat from which the paint is run into the smaller receptacles. Fig. 6 is a sectional view taken through one of the openings in the bottom of the vat. Fig. 7 is a side view of the outside of the vat, and Fig. 8 is a sectional view of one of the nozzles or measuring chambers beneath one of the openings in the bottom of the vat.

1, in the drawings, is a frame for supporting the parts of the structure. A vat 2 is supported upon a shaft 3. A table 4 is also connected to the shaft 3. The shaft 3 is supported in bearings 5 and 6 located in the frame 1. The shaft 3 is rotated by means of the beveled gears 7 and 8 which are connected to a source of power such as the motor 9. The vat 2 and the table 4 are rotated slowly in the frame 1.

The lower side of the vat 2 is provided with a plurality of nozzles 10 which also constitute a means for measuring the quantity of the fluid or mobile material that is to be delivered. The material is fed into receptacles that are placed upon the table 4 and consequently the receptacles are placed beneath the nozzles 10. They are rotated with the nozzles 10 and during certain periods in the revolution of the table and the tank 2 within the frame 1, the material is emptied into the receptacles.

The nozzles 10 are located beneath openings 11 formed in the bottom of the vat 2. Each opening 11 is closed by a plate 12 which is connected to a lifting rod 13. The lifting rod is connected to a roller 14 that is lifted by the runway 15 located on the rear side of the frame 1. The roller is carried up the incline 15 until it reaches the top of the incline which is back of the center of the frame 1, that is, directly back of the shaft 3 in the position shown in Fig. 1. The roller then passes down the incline forming part of the runway 15. It also passes beneath the arcuate strip 16 which operates to force the roller down as it passes around toward the side of the frame. This pushes the plate 12 down against the bottom of the vat 2 and thus the opening 11 is closed. During this operation the paint passes through the opening 11 into the measuring nozzle 10. Inasmuch as the vat 2 is provided with as many openings 11, plates 12, lifting rods 13 and rollers 14 as there are measuring nozzles 10, the nozzles 10 will be filled as the rollers associated therewith pass up and down the runway 15.

While the plates 12 are lifted the nozzles 10 of necessity are closed and to avoid drawing against the atmospheric pressure a small opening 20 is located in the plate 12 and a slide valve member or plate 21 is located beneath the plate 12 and normally operates to close the opening 20. The plate 21 is connected to a rod 22 which is provided with an arm 23 and a roller 24 is located on the frame 1 so that when the roller 14 starts up the runway 15 the arm 23 strikes the roller 24 and swings the plate 21 to one side of the opening 20 and thus allows a small amount of paint to enter into the nozzle 10 which is thus in position to have its associated cover plate 12 to be operated. The small amount of paint that passes through the opening 20 releases the suction that would otherwise be produced which enables the roller 14 to readily rise up the incline 15. The paint thus quickly passes through the opening 11 and fills the measuring chamber or nozzle 10. Each nozzle is thus filled in succession when it has passed the side of the frame 1. A spring 26 operating between the collar 27 secured to the rod 22 and the plate 12 holds the plate 21 against the underside of the plate 12. When the plates 12 pass beneath the roller 49, the arms 23 connected therewith strike the roller 49 and thus close the openings 20.

The plate 12 is also connected to a tubular member 30 which opens at its lower end on the under side of the plate 12. The tubular member 30 provides a means for allowing the air to enter into the measuring chambers 10 when the chambers are opened from the bottom to allow the paint to flow into the receptacles. The ends of the tubular members are closed by the plates 21 when the plates 12 are about to be raised and are kept closed until the plates 21 are operated by the roller 49, that is, until the plates 12 are about closed. This prevents paint from filling the pipes 30.

The chambers or nozzles 10 are opened and closed by means of rollers 35 which are connected to shutter plates 36 that move between plates 37 secured on the bottom of the measuring chambers or nozzles 10 and the bottom of the nozzles 10. The lower ends of the chambers are provided with a cone or funnel shaped portion 38 which directs the material to the opening 39 through which the paint passes from the nozzle 10. The rollers 35 are operated by cam shaped arms 40 and 41, the first operating to open the nozzles and the latter operating to close the nozzles. The paint is thus allowed to flow from the nozzles into the receptacles as they pass across the front of the frame in the position shown in Fig. 1. As the nozzles pass to the back of the frame the cam 41 operates upon the rollers 35 and closes the plates. Immediately upon closing the plates the arm 23 strikes the roller 24 and the roller 14 starts to lift the rod 13 and the plate 12 associated with the nozzle which has thus been closed by the cam arm 41. The cam arms 40 and 41 are secured by brackets 42 and 43 to the frame 1. The rollers thus pass behind the arm 40 and in front of the arm 41 to open and close the nozzles. The upper ends of the rods 22 and 13 and the pipes 30 are held in position by the bracket 39.

In order that the paint may be mixed during the filling operation, that is, in order to prevent the settling of the heavier materials of the paint, the vat 2 is provided with a cross-bar 45 that is secured to the rod 46. The rod 46 is bolted to the top of the frame 1 and is held stationary. The cross-bar 45 is provided with a plurality of uprights 47, preferably in the form of plates, which extend diagonally across the bar 45. The rotation of the vat 2 by the operation of the shaft 3 causes the paint to strike the plates 47 and be deflected from the circular movement that would thus be normally produced by the rotation of the vat 2.

I claim.

1. In a paint filling machine, a vat having a plurality of openings extending through the bottom of the vat, a plurality of measuring nozzles located beneath the openings, plates for covering the openings, each of the plates having an opening, a second plate for opening and closing the last named opening to permit a small amount of paint to pass through the first named plate, means for lifting the first named plate to allow paint to pass into the nozzle.

2. In a paint filling machine, a vat having a plurality of openings in the bottom thereof, a plurality of measuring nozzles covering the said openings, the said nozzles having openings in the bottom thereof, and means for opening and closing the bottom of the nozzles, plates for closing the openings of the vat and having openings extending through the plates, pipes extending from the top of the vat to and through the plates, a second set of plates for opening and closing the openings in the first named plates and closing and opening the said pipes, and means for lifting the first named plates to open the openings in the bottom of the vat.

3. In a paint filling machine, a vat and a table, means for rotating the vat and the table, a plurality of measuring nozzles connected to the bottom of the vat, the bottom of the vat having openings for permitting communication between the vat and the nozzles, plates for closing the said openings, rods connected to the said plates, rollers connected to the said rods, a camway for lifting the said rollers and the said plates, the said plates having openings, a second set of plates for opening and closing the said openings, rods connected to the last named plates, means for rotating the last named rods for rotating the last named plates to open and close the said openings, pipes extending from the first named plates to the top of the tank, the second named plates operating to close and open the lower ends of the said pipes, the nozzles having plates for closing and opening the lower ends of the said nozzles, rollers connected to the last named plates, and cam arms for closing and opening the said last named plates.

In testimony whereof I have hereunto signed my name to this specification.

HOWARD C. MILLER.